July 2, 1935. R. S. BROWN 2,006,496
MACHINE TOOL
Filed Nov. 10, 1931 11 Sheets-Sheet 1
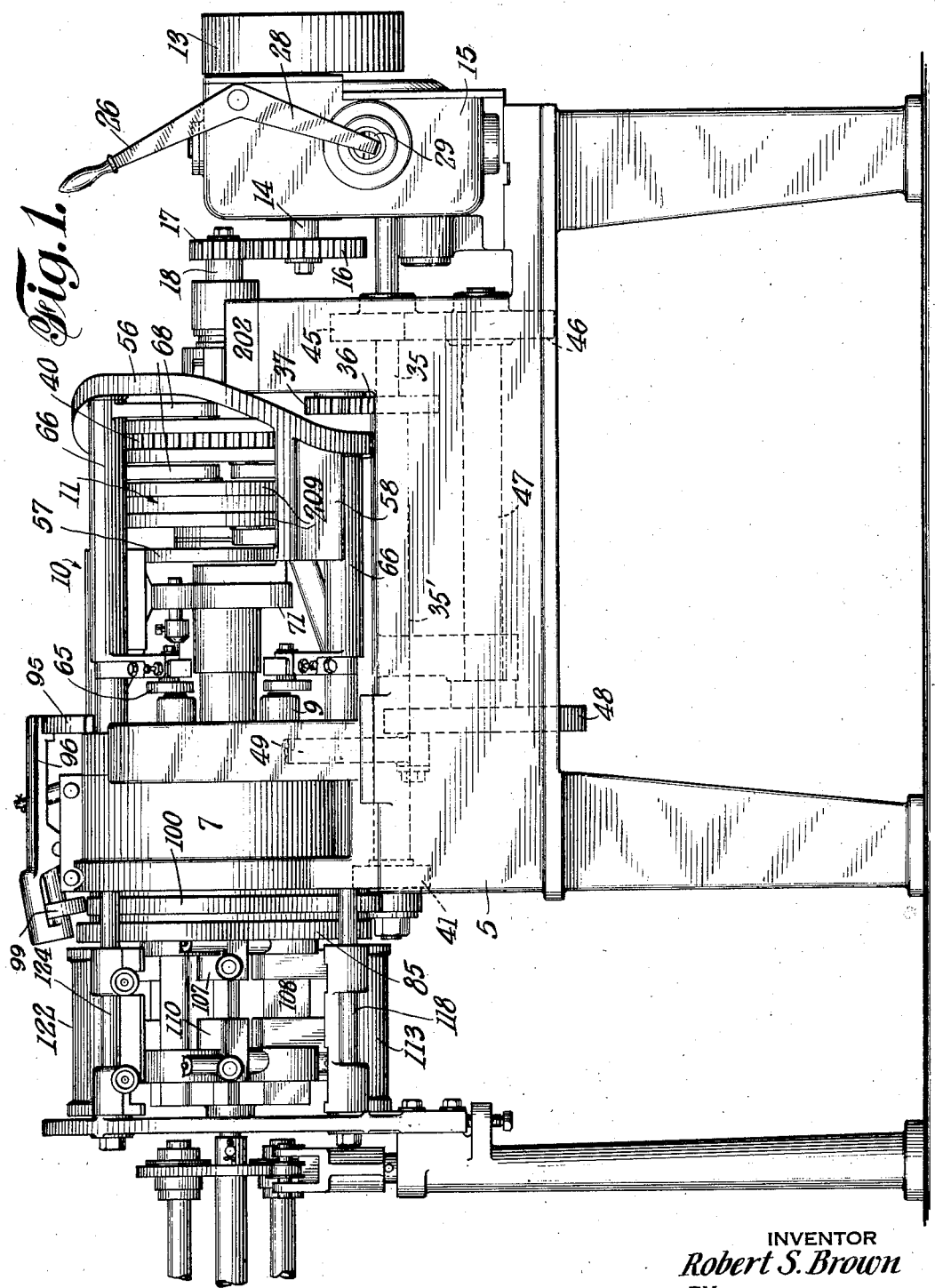
INVENTOR
Robert S. Brown
BY
Mitchell Bechert
ATTORNEYS.

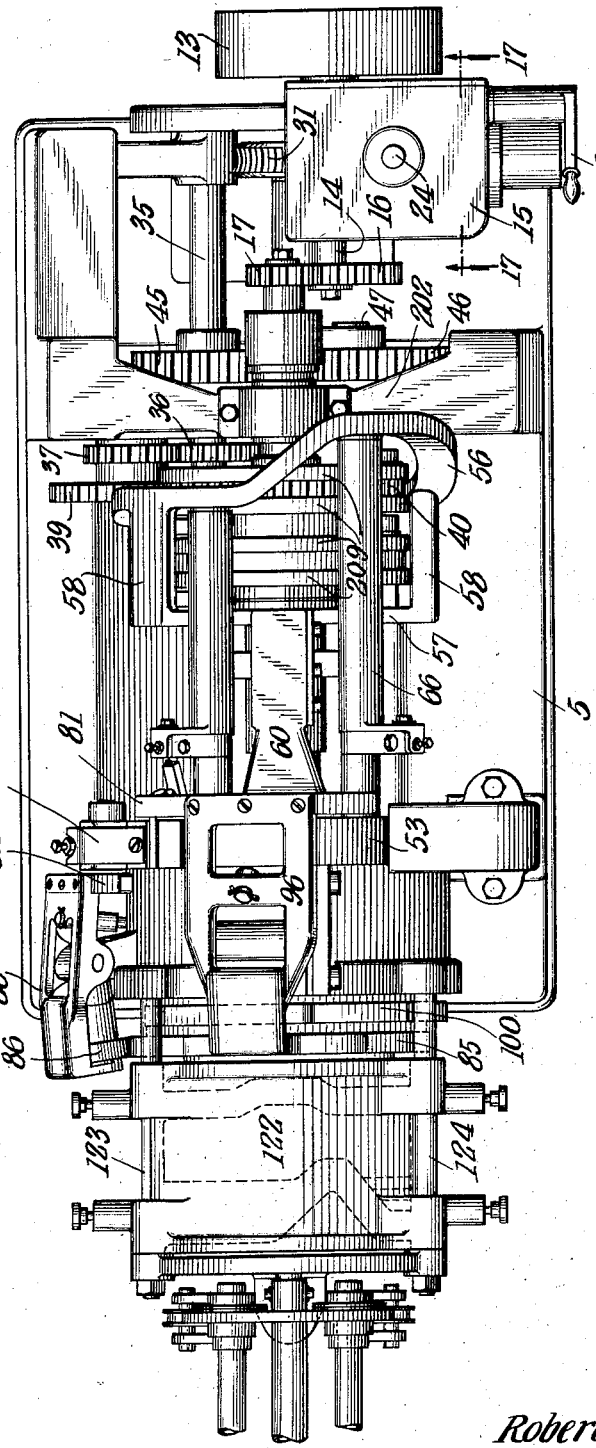

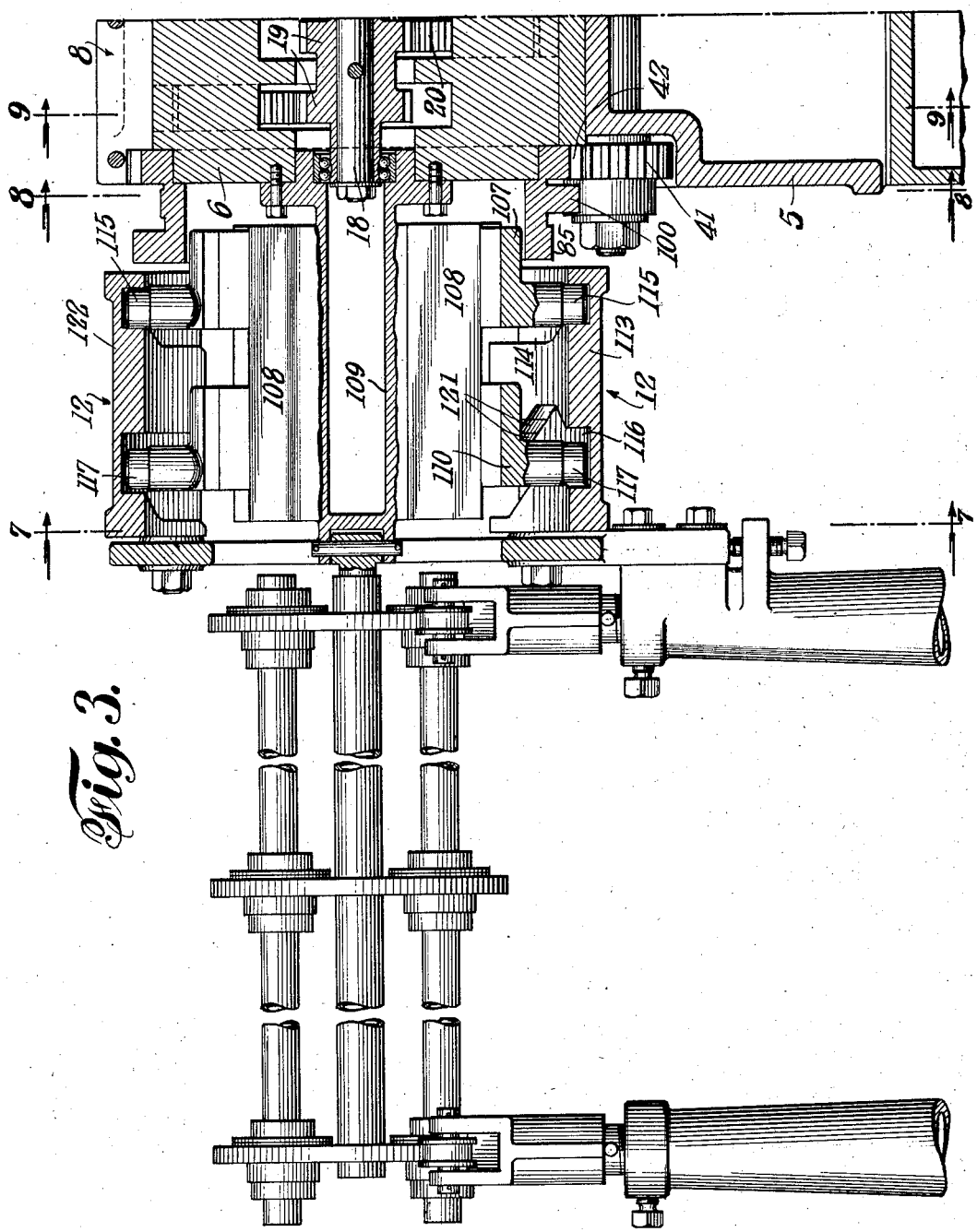

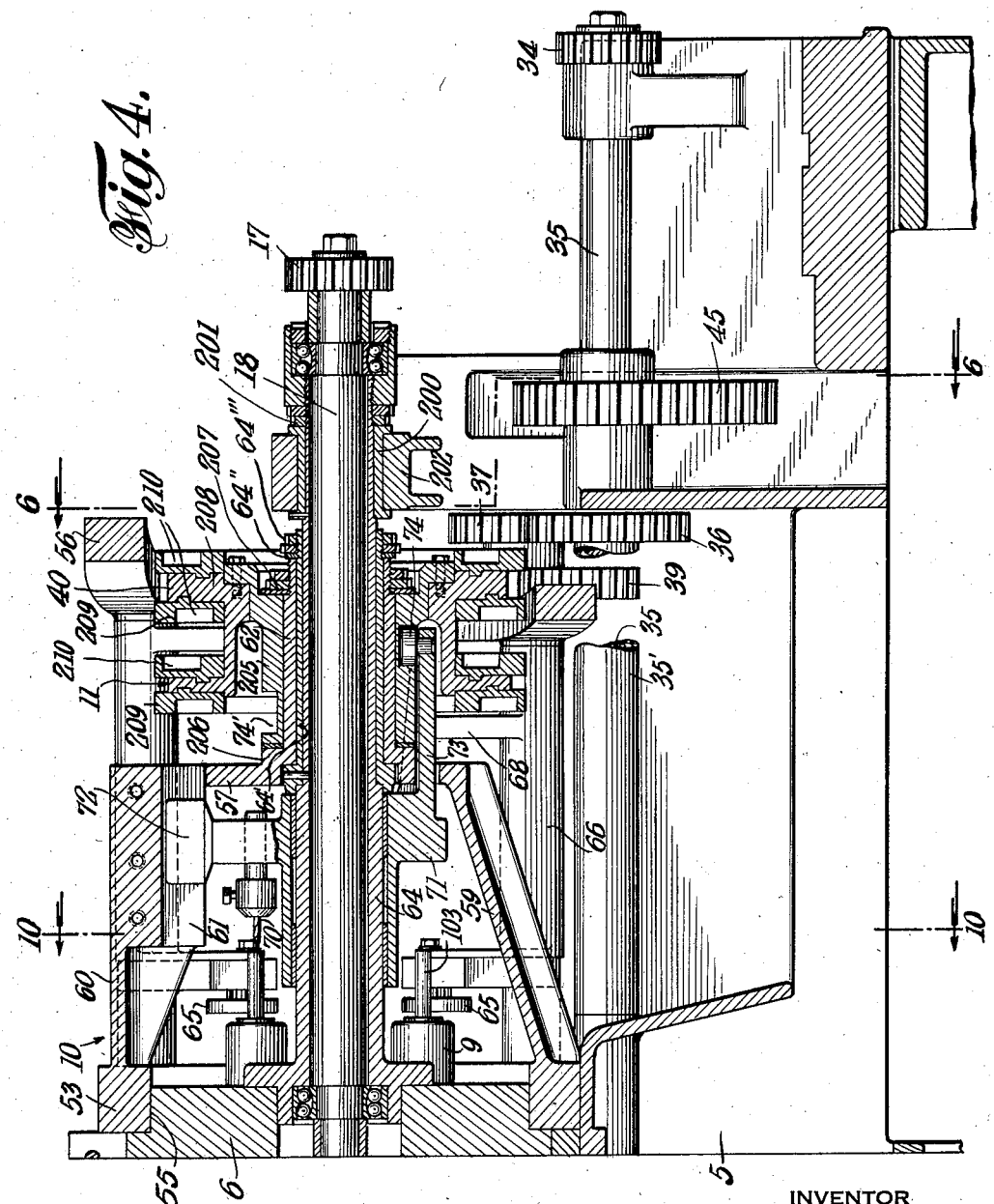

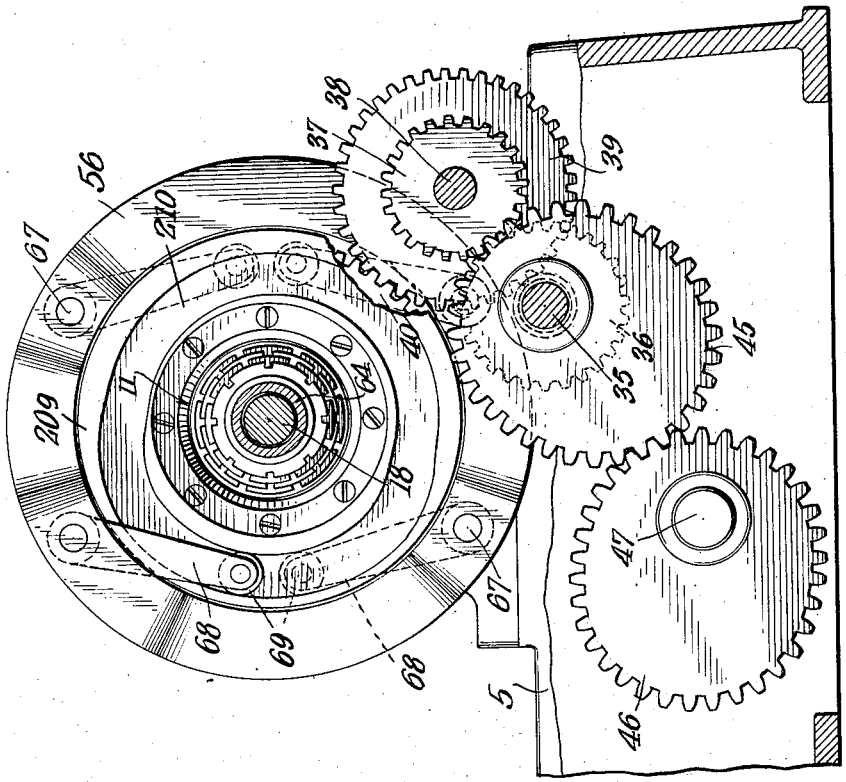
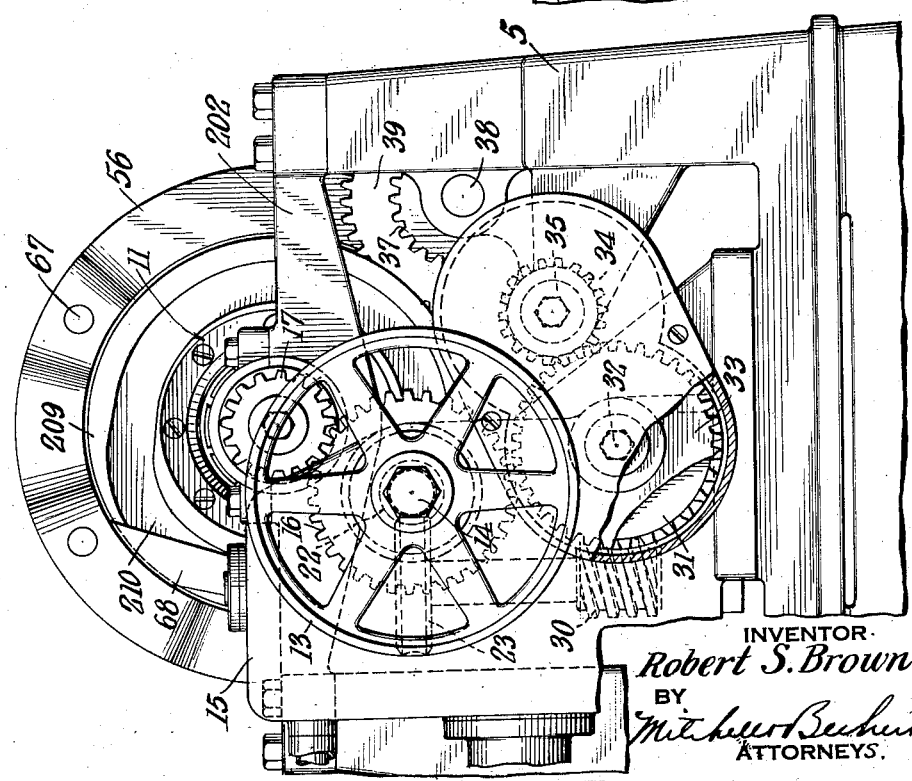

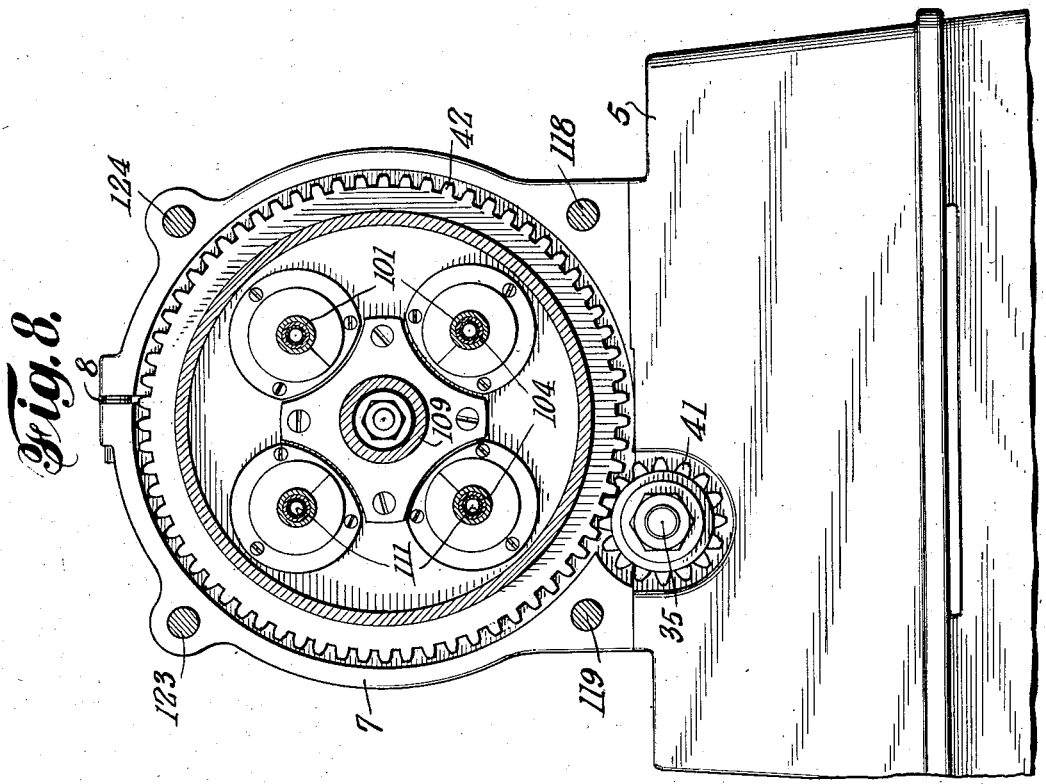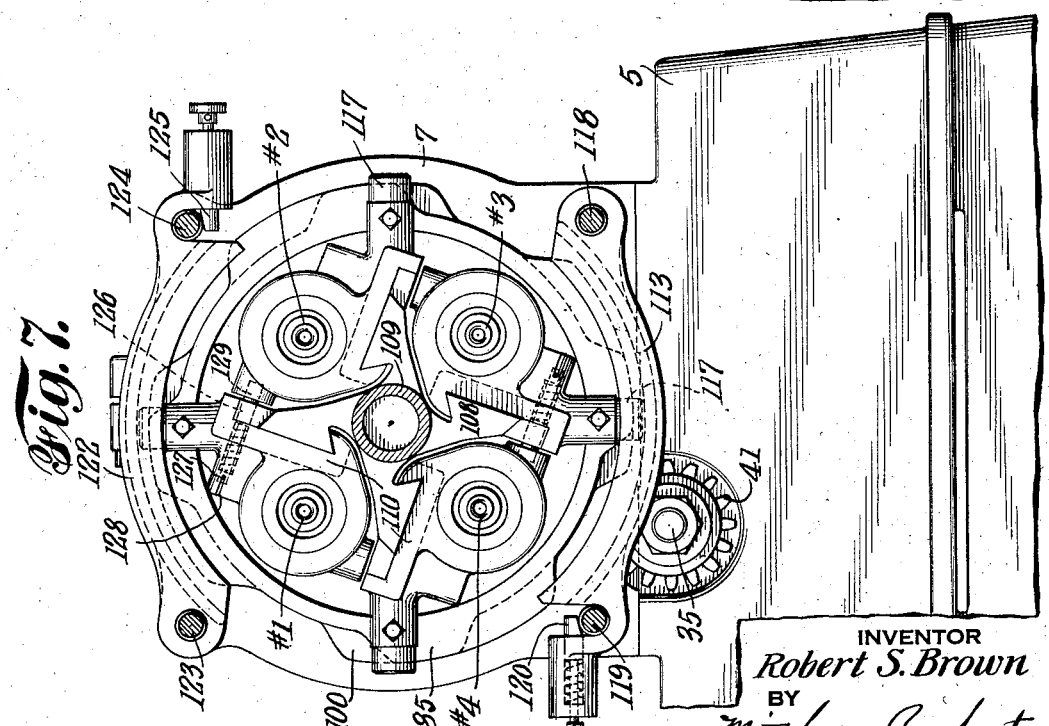

July 2, 1935.  R. S. BROWN  2,006,496
MACHINE TOOL
Filed Nov. 10, 1931   11 Sheets-Sheet 7
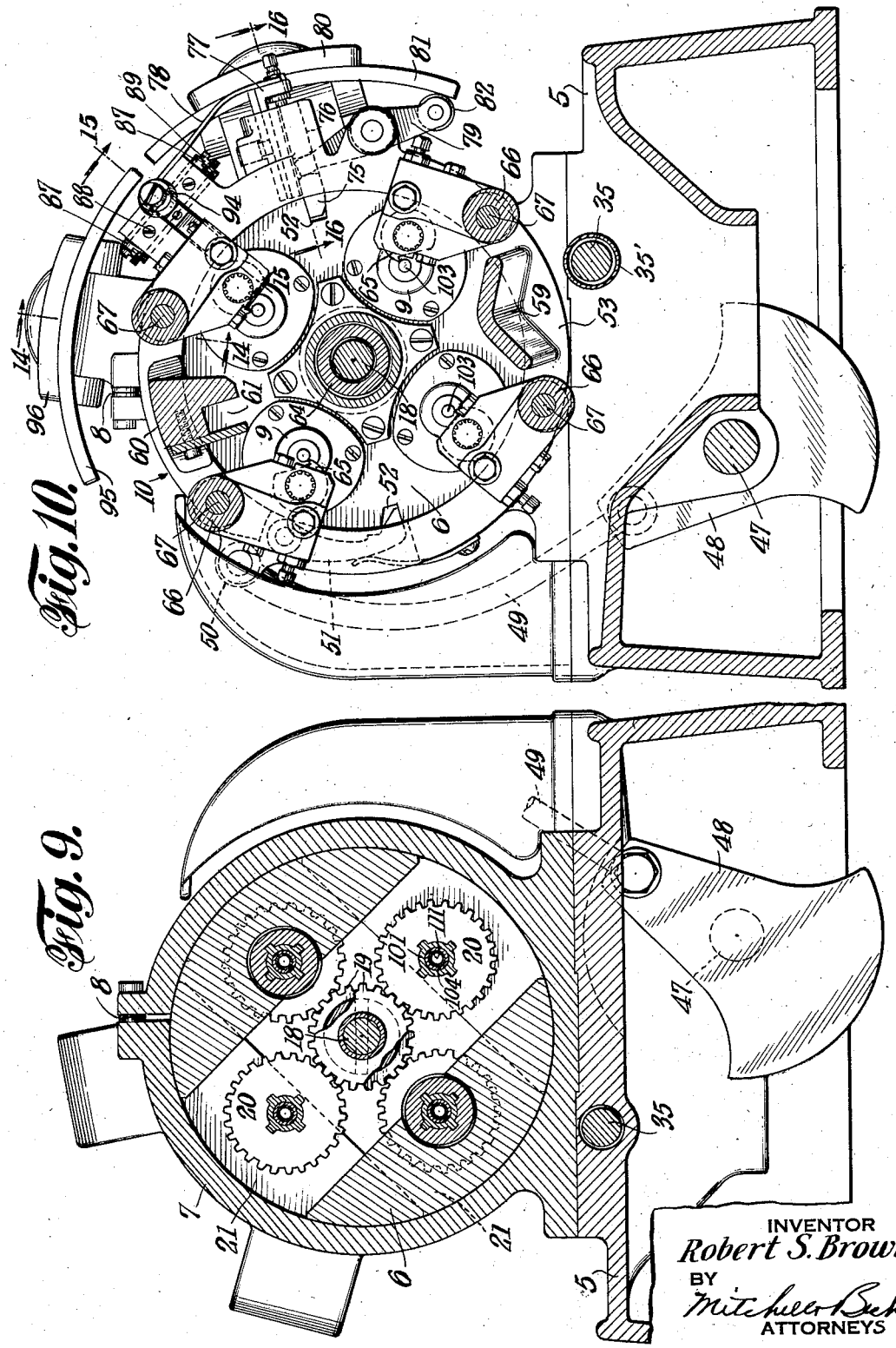
INVENTOR
Robert S. Brown
BY
ATTORNEYS

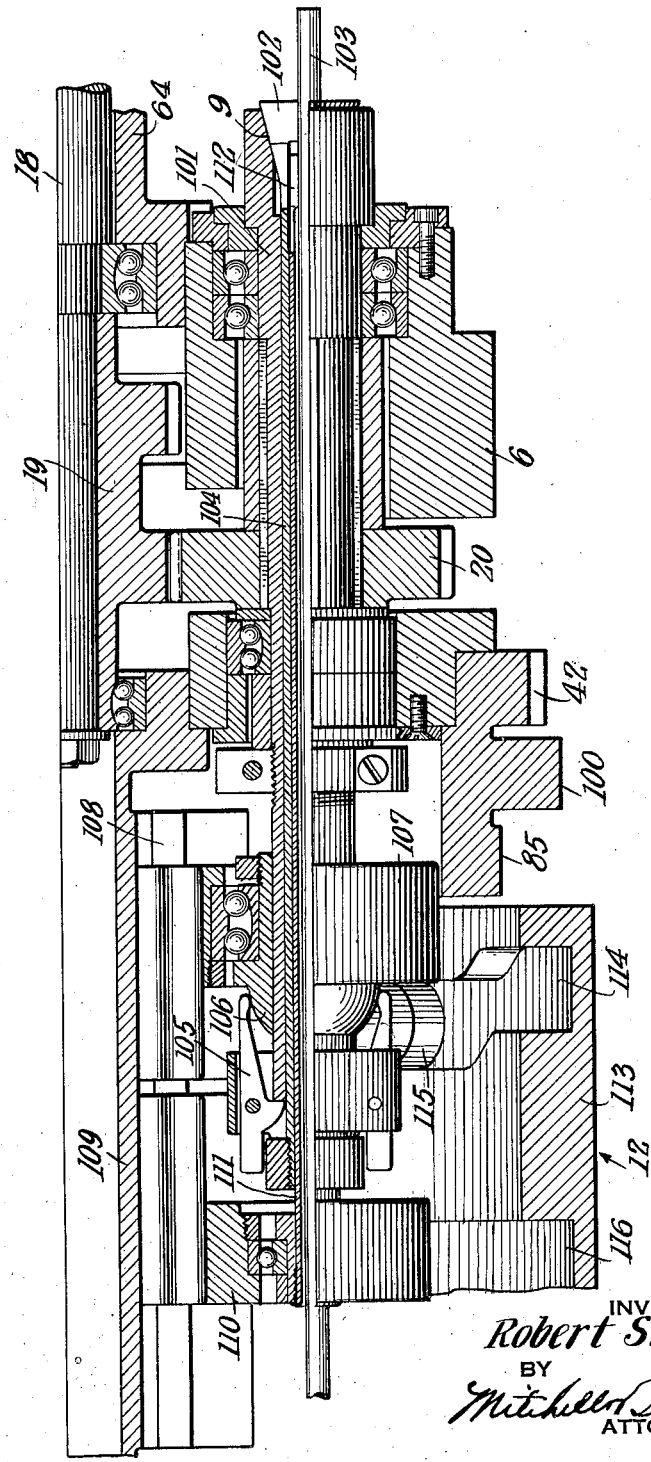

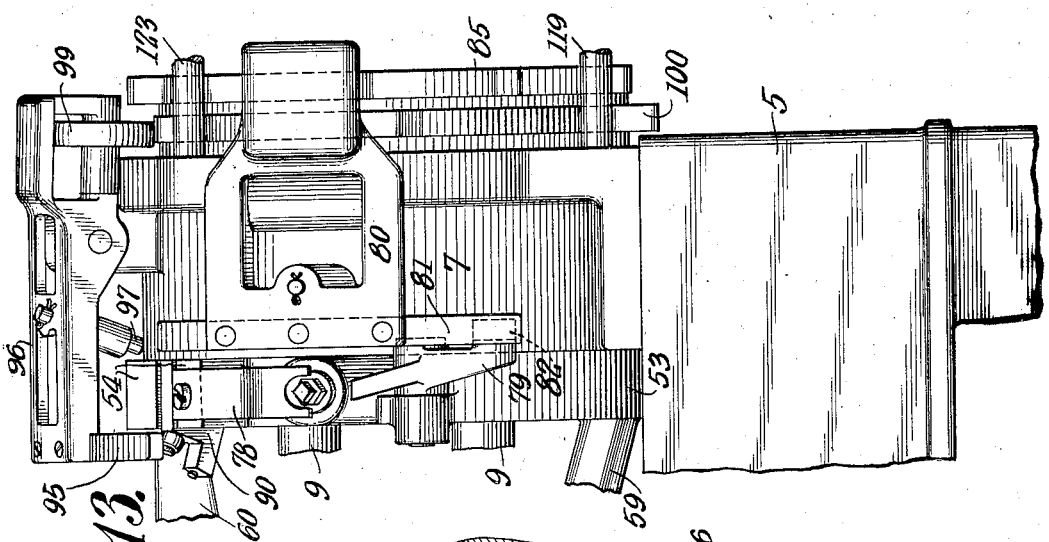

July 2, 1935.  R. S. BROWN  2,006,496
MACHINE TOOL
Filed Nov. 10, 1931   11 Sheets-Sheet 10
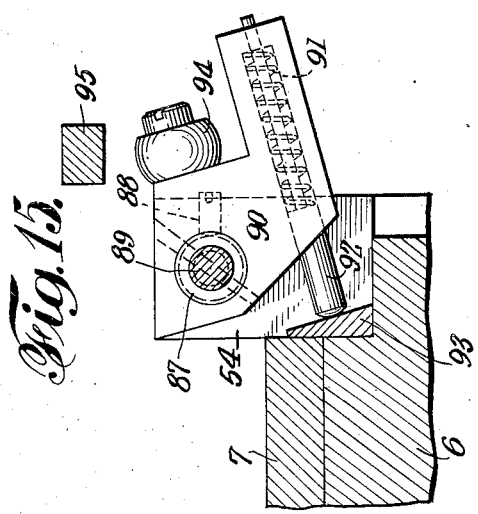
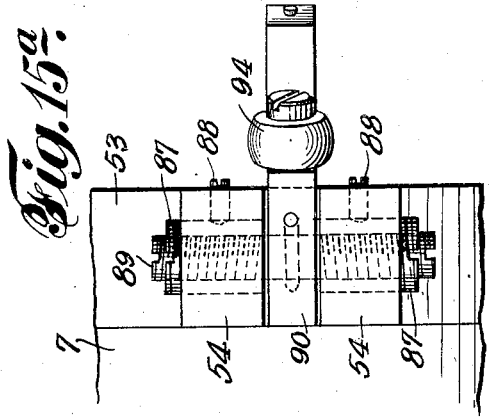
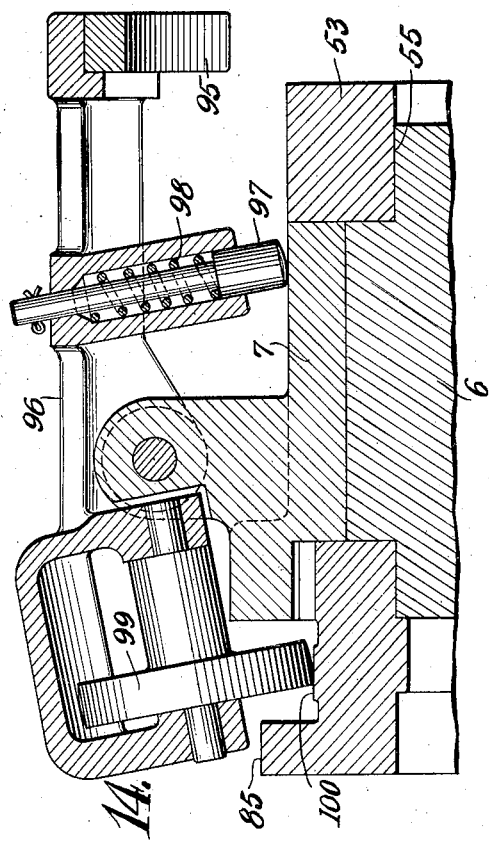
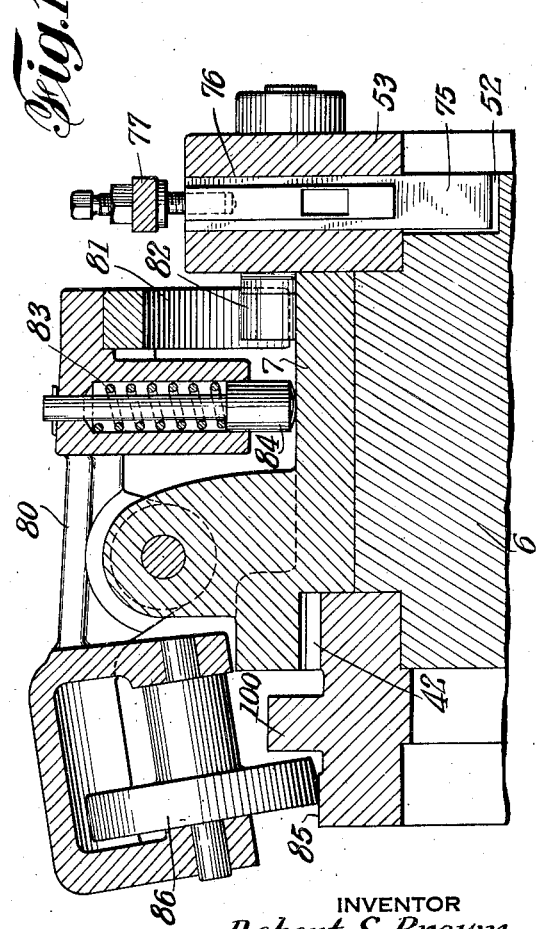
INVENTOR
Robert S. Brown
BY
ATTORNEYS.

July 2, 1935.　　　　R. S. BROWN　　　　2,006,496
MACHINE TOOL
Filed Nov. 10, 1931　　　11 Sheets-Sheet 11

INVENTOR
Robert S. Brown
BY
ATTORNEYS.

Patented July 2, 1935

2,006,496

UNITED STATES PATENT OFFICE 2,006,496

MACHINE TOOL

Robert S. Brown, New Britain, Conn., assignor to The New Britain-Gridley Machine Company, New Britain, Conn., a corporation of Connecticut Application November 10, 1931, Serial No. 574,117

52 Claims. (Cl. 29—37)

My invention relates to a multiple spindle automatic machine and more particularly to an automatic intended for maximum production of small diameter pieces from bar stock. The invention contemplates various features of improvement, some of which are applicable to machines other than the one to be described herein.

It is well known that the economy of the multiple spindle automatic is due in a large measure to the possibility of producing a completed piece in the time of the single longest operation upon it. When the time of this longest operation has been so subdivided on a piece of work that the cuts are equal to, or even less than, the indexing time of the machine while passing from station to station and not cutting, the economy of the multiple spindle machine becomes questionable, and a single spindle automatic with a rapidly indexed tool turret may be as economical. On large diameter work where the time of indexing is a relatively small portion of the total time of the cuts, the economy of the multiple spindle machine is a well recognized fact, and such economy accounts for the high productivity and general acceptance of the multiple spindle automatic on such large work.

From the foregoing it appears that a deciding factor in the small size limit of a multiple spindle automatic may be the speed at which it can be indexed. It is manifest that a group of spindles in a cylinder with long bars in the spindles and a stock reel together with associated parts makes a more ponderous mass to index than a relatively lighter tool group and a mass which can therefore not be indexed as rapidly. One feature of my invention is the provision for slowly rotating the cylinder carrier and associated parts and rapidly indexing a lighter tool carrier group.

It is a general object of my invention to provide a multiple spindle automatic of the character indicated which will be economical in the production of small size pieces from the bar stock.

It is a more specific object to provide a multiple spindle automatic in which only relatively light parts need be indexed.

Another object is to provide a multiple spindle automatic in which tooling operations may be performed during a rotating movement of the spindle carrier whether that movement be an accelerated periodic or indexing movement or a relatively continuous rotation.

It is another object to provide improved indexing or rotating means for a carrier.

Still another object is to provide a multiple spindle automatic in which the cylinder and associated parts will be rotated substantially continuously and in which the tool or tools may be moved from station to station or indexed.

Still another object is to provide improved stock feeding and chucking means.

It is another object to provide a machine which by very simple means may be made to produce one piece or a plurality of pieces during each indexing movement of movement from station to station.

It is another object to provide improved features including details of construction in a machine of the character indicated.

Other objects and features of invention and novelty will either be hereinafter pointed out or will become apparent upon a reading of the specification.

Briefly stated, in a preferred form of the invention I employ a carrier having a plurality of chucking devices, such as chucks carried by rotatable spindles. The spindle carrier, instead of being indexed in the usual sense, may be rotated substantially continuously and a relatively lighter tool or group of tools may be indexed or moved from station to station for the performance of tooling operations upon work pieces carried by the chucks. Preferably the tool carrying means during the cutting operation of the cycle is rigidly secured to or moves with the spindle carrier, and during what may be termed an idle time of the machine the relatively light tool or group of tools is rapidly indexed to a new position to cause the tools to act on work pieces successively. The machine is preferably arranged so as to accomplish the unchucking, feeding, and chucking up of the stock during the idle movement of the tool group, whereby the indexing means for the tools may be relieved of the relatively heavy work of actuating the stock feeding and chucking mechanism. The stock feeding and chucking mechanism is also preferably arranged so that without substantially altering the machine and merely by employing certain parts in group or combinations, a single piece or a plurality of pieces may be produced upon each indexing movement or movement from what may be termed station to station.

In the drawings I have chosen for illustration of various features of the invention a four-spindle machine, which will be described as an entirety with the understanding, however, that the invention may be variously embodied and that certain parts may be employed in connection with other types of machines and that other more or less complete combinations may be made of the parts disclosed.

In said drawings—

Fig. 1 is a front elevation of a machine embodying features of the invention;

Fig. 2 is a top plan view of the machine shown in Fig. 1;

Fig. 3 is a central vertical sectional view of the left-hand portion of Fig. 1 on an enlarged scale;

Fig. 4 is a view similar to Fig. 3, but of the right-hand portion of the machine, and is a continuation of Fig. 3, parts being omitted for the sake of illustration;

Fig. 5 is a right-hand end view of the machine shown in Fig. 1, parts being broken away;

Fig. 6 is a sectional view taken substantially in the plane of the line 6—6 of Fig. 4;

Fig. 7 is a sectional view taken substantially in the plane of the line 7—7 of Fig. 3;

Fig. 8 is a sectional view taken substantially in the plane of the line 8—8 of Fig. 3;

Fig. 9 is a sectional view taken substantially in the plane of the line 9—9 of Fig. 3;

Fig. 10 is a sectional view taken substantially in the plane of the line 10—10 of Fig. 4;

Fig. 11 is an enlarged fragmentary view of the spindle carrier and a spindle in quarter section and certain associated parts;

Fig. 12 is an isometric view of a tool carrier organization;

Fig. 13 is an enlarged fragmentary view in rear elevation of a part of the spindle carrier housing and spindle carrier with associated parts for actuating parts of the tool carrier organization;

Fig. 14 is an enlarged fragmentary sectional view taken substantially in the plane of the line 14—14 of Fig. 10 and illustrating details of the mechanism for actuating a clamp part of the tool carrier organization;

Fig. 15 is an enlarged detail sectional view, taken substantially in the plane of the line 15—15 of Fig. 10;

Figure 18:
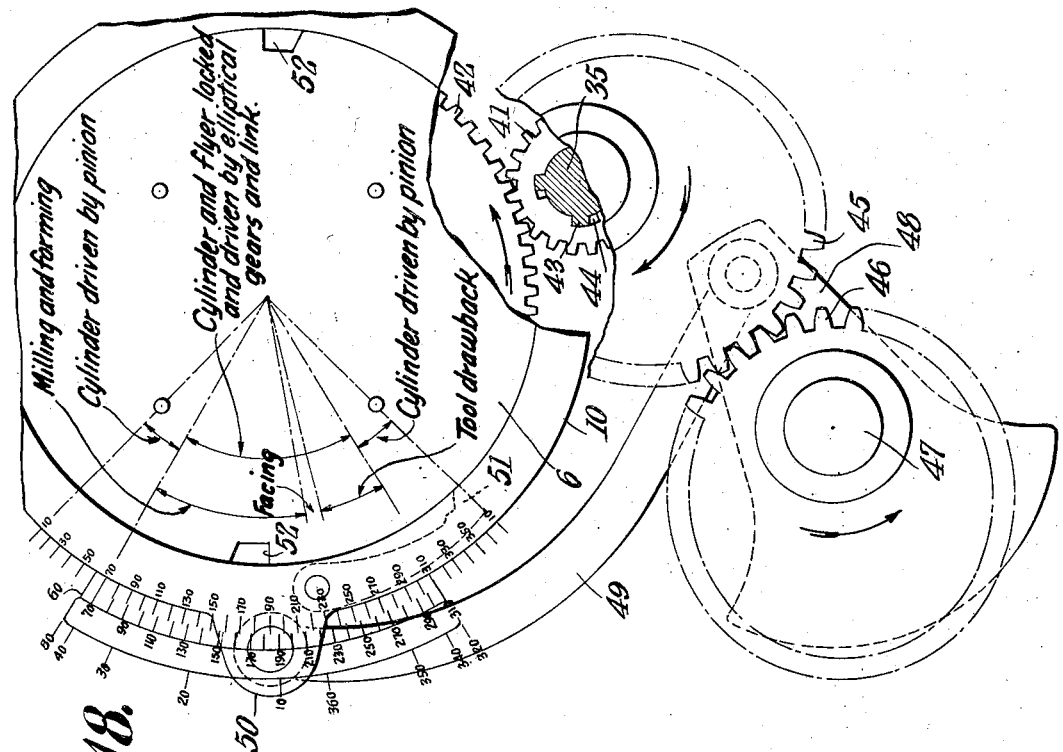
Figure 17:
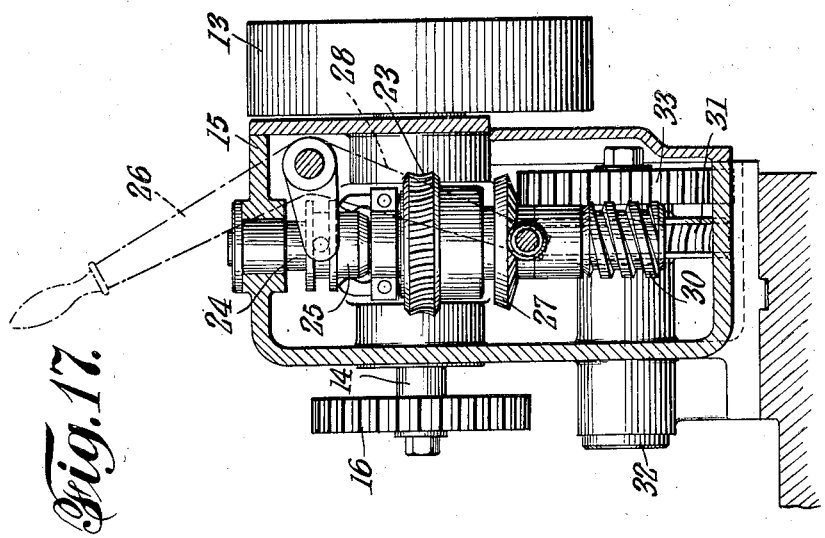

Fig. 15ᵃ is a fragmentary plan detail view of parts indicated in Fig. 15;

Fig. 16 is an enlarged fragmentary sectional view taken substantially in the plane of the line 16—16 of Fig. 10 and illustrating a locking bolt and actuating mechanism associated with the spindle carrier and tool carrier;

Fig. 17 is an enlarged vertical sectional view taken substantially in the plane of the line 17—17 of Fig. 2 and showing the primary drive mechanism of the machine as illustrated in Figs. 1 and 2 and cooperating with parts shown in Fig. 4;

Fig. 18 is an illustrative semi-diagrammatic view of spindle and tool carrier mechanism and actuating means therefor.

The machine illustrated comprises in general a frame or base portion 5 upon which is revolubly mounted a work carrier, such as the cylinder or spindle carrier 6. The housing part 7 forming a bearing for the cylinder may be split and shimmed, as indicated at 8, to allow for taking up wear. The spindle carrier carries a plurality of chucking devices, such as collet chucks 9, carried on rotatable spindles shown more in detail in Fig. 11. A tool or group of tools may be carried by a tool carrier 10, shown in detail in Fig. 12 and which may be hereinafter referred to for want of a better term as a "flyer". This tool carrier organization or flyer is arranged to be moved or oscillated so as to cause the tools to serially act upon the work carried by the chucks. The spindle carrier preferably rotates substantially continuously, whereby a relatively ponderous mass involving the spindle carrier with rotating spindles, stock reel, stock tubes, and bar stock will not be subjected to the shocks of acceleration and deceleration always incident to the usual spindle carrier indexing. The tool carrier organization being relatively lighter may be indexed very rapidly without substantial shock. The cam means designated generally 11 serves to control the tools, as will be later described. Between indexing movements the spindle carrier and tool carrier preferably move unitarily, and during such movement the tooling operations are performed. The stock is fed, chucked, and unchucked, by cam means designated generally 12, as will be later described.

*Drive means*

Referring particularly to Figs. 1 to 6 and Fig. 17 it will be seen that the initial drive is from a drive pulley 13 on the main drive shaft 14 carried by a unitary power case or housing 15 on the frame. On the main drive shaft 14 is a pick-off gear 16 which meshes with and drives a second pick-off gear 17 on the central spindle drive shaft 18, which passes centrally into the spindle carrier (Figs. 3, 4). The pick-off gears 16—17 may be changed so as to secure any desirable spindle speeds.

The main spindle drive shaft 18 carries a gear or gears 19 for driving the spindle drive gears 20—20 on the spindles (Fig. 9). In the form illustrated the spindle carrier is cored out centrally for the reception of the drive gear mechanism 19, and in order to facilitate assembly and disassembly of the gears 20, and without substantially weakening the cylinder, the latter is provided with radially extending slots, which may be diametrically extended through slots 21—21 at substantially right angles to each other and spaced from each other longitudinally of the spindle carrier. Thus the end portions of the spindle carrier are attached to each other by very substantial segments opposite each other. The slots do not serve to substantially weaken the spindle carrier, as would be the case if the slots intersected, and at the same time free access is afforded for the insertion and removal of the spindle drive gears 20—20. The spacing of the slots longitudinally also permits the use of larger gears 20 on the spindles than would be possible if all the gears were in the same plane. In fact the gears 20 might be of a size to overlap each other—a construction which would be impossible if adjacent gears were coplanar.

From the main drive shaft 14 both the feed cam drives and the indexing drives are taken. The shaft 14 carries a worm 22 for driving a worm wheel 23 (Figs. 5, 17), mounted on a stub shaft 24. The worm wheel 23 may be clutched to and unclutched from the shaft 24 by means of any desirable clutch mechanism 25, actuated by a handle 26. A bevel gear 27 may be carried by the shaft 24 and may be engaged by a bevel gear 27', to be actuated by a hand crank (not shown), whereby the shaft 24 may be rotated by a hand crank for setting up. The lever 26 may carry a projecting guard arm 28 which extends over the opening 29 in the casing 15, so that when the clutch 25 is engaged it will be impossible to insert the hand crank, and it is only when the main feed clutch 25 is disengaged that the guard arm 28 is displaced so as to permit hand cranking.

The shaft 24 also carries a worm 30 which drives a worm wheel 31 on a stub shaft 32 in the power case 15. The shaft 32 also carries a pick-off gear 33, which meshes with a second pick-off gear 34 on a shaft 35. The pick-off gears 33—34 may be suitably encased, as illustrated. Clearly, by substituting other pick-off gears for those shown, various feeds may be secured. The shaft 35 at its inner end carries a gear 36, meshing with a gear 37 on a shaft 38 mounted in the frame. Also mounted on the shaft 38 is a spur gear 39, meshing with and driving the cam drive gear 40, which serves to rotate the feed cam mechanism designated generally 11 (Figs. 4, 5, 6). For a purpose which later will be clear the gear ratios are such that for one revolution of the shaft 35 there will be one revolution of the feed cams.

The shaft 35 extends longitudinally of the frame to the rear end of the spindle carrier, where it is provided with a driving pinion 41, meshing with a ring gear 42, rigidly carried by or with the spindle carrier. A guard sleeve 35' may encase that part of the shaft 35 in the chip fall zone to prevent chips from winding up on the shaft. For a four-spindle machine as illustrated the gear ratios are such that for each complete revolution of the spur 41 one-quarter of a revolution of the spindle carrier will be made. As shown more particularly in Fig. 18, the driving spur 41 is not rigidly carried by the shaft 35, but is carried thereby with a circumferential lost motion connection, as by providing splines 43 on the shaft to take into enlarged keyways 44 in the bore of the gear 41. Thus, with the shaft 35 rotating in a clockwise direction as viewed in Fig. 18, the spur gear 41 will be rotated thereby and the spindle carrier gear 42 will be thereby driven. However, with the spindle carrier driven by other means to be described, the gear 42 may drive the spur pinion 41 slightly ahead of the shaft 35.

As heretofore indicated the spindle carrier is, in the preferred form, rotated substantially continuously, and one of the means for driving the same during a part of its revolution comprises the shaft 35 and driving spur 41. The other means in a preferred form will now be described. The shaft 35 nearer its power case end is provided with an eccentrically mounted gear, which may be an elliptical gear 45 (Figs. 6, 18), which meshes with a similar gear 46 on the shaft 47, which extends rearwardly of the frame and is provided with a crank 48 (Figs. 1, 9, 10, 18), to which is attached a connecting rod or link 49. The link 49 is pivotally secured, as by the ears 50, to the tool carrier mechanism or flyer 10 (Fig. 12). The flyer is likewise provided with means, such as a spring pressed pawl 51, to engage the side of locking slots 52 on the forward end or an extension of the spindle carrier.

It may now be stated that the flyer and the spindle carrier, by means to be described, may be locked and clamped to each other during the cutting time of the cycle. With the shaft 35 rotating clockwise as viewed in Fig. 18 and with the characteristics of the elliptical gears and link shown, the entire flyer and all parts connected therewith will be rotated in a clockwise direction and at a rapid rate. Upon further rotation and with the pawl 51 in engagement with the slot 52 of the spindle carrier, the latter will be moved with the flyer and at a rate dependent upon the particular characteristics of the elliptical gears or other means employed.

In Fig. 18 the right-hand scale indicates uniform rotation through one complete revolution of the drive shaft 35. Thus, if the drive pinion 41 were to continually drive the spindle carrier, one complete revolution of the drive pinion 41 would cause a uniform angular velocity one-quarter revolution of a spindle carrier, that is, from one spindle station to the next in a four-spindle machine. The middle scale indicates angular velocities of the flyer (referred to angular velocities of the shaft 35) as driven by the drive shaft 35, but modified by the elliptical gears and crank and connecting rod. It will be observed that during the working range, which begins at about 60° and extends to about 310°, there is a fairly uniform rotation of the flyer by the elliptical gears and crank mechanism. During this working range, by a means to be later described, the spindle carrier and the flyer are rigidly clamped to each other, and the spindle carrier, instead of being driven by the drive pinion 41, is carried along or driven by the flyer and runs during the first portion of its movement slightly ahead of the normal drive by the spur pinion 41, and during the latter portion of its revolution slightly behind the normal drive of the spur pinion. Thus, at the beginning and the end of the uncoupled drive the speed of rotation of the spindle carrier is substantially the same whether it be considered as being driven by the drive pinion 41 or by the flyer. At any point intermediate the beginning and the end of the coupled drive there is a slight variation from the normal spur pinion drive, and to take care of such variation the loose splined connection 43—44 has been provided. At the termination of the coupled drive the speed of the spindle carrier is again equal to the normal speed of drive by the spur pinion 41, and when the flyer and spindle carrier are uncoupled the latter continues its rotation under the influence of the drive pinion 41, and the flyer is quickly returned to its starting position. The left-hand scale in Fig. 18 indicates angular velocities (referred to angular velocities of shaft 35) of the return or uncoupled movement of the flyer.

It will thus be seen that from 60° to 310° or a total of 250° referred to the scale of rotation of the drive shaft 35, the spindle carrier and flyer are rotating together. During the remaining 110° the flyer has been harmonically decelerated, stopped, accelerated in the opposite direction, swiftly moved, again harmonically decelerated and harmonically accelerated in the direction of spindle carrier rotation, so as to catch up with the speed of the spindle carrier, and this all without any substantial shocks. It is during the coupled drive, as will be later described, that the tooling operations are performed on the work pieces carried by the spindle carrier chucks.

*Tool carrier*

As indicated above, one feature of the invention comprises a multiple spindle machine in which a tool carrier is rapidly moved or indexed and periodically related to the work carrying device so as to perform tooling operations. The multiple spindle carrier or barrel together with stock reel, bars of stock and associated parts, may be rotated from station to station substantially continuously, so that the relatively ponderous mass is not subjected to the shocks incident to the usually understood term of "indexing", which would require a rapid acceleration and movement and a rapid deceleration and stopping of the relatively heavy mass. The tool group is relatively light and may therefore be rapidly indexed and, in accordance with my invention, is secured to or otherwise periodically synchronized with the spindle carrier and associated parts and the tooling operations are performed during unitary rotative movement of the spindle carrier and tool group.

In the preferred form the tool carrier comprises a skeleton-like frame work carrying or supporting a plurality of tools. As illustrated in detail in Fig. 12, the tool carrier or flyer 10 comprises a ring 53, which is split and provided with ears 54—54, which may be drawn together so as to cause the ring 53 to tightly clamp upon the spindle carrier or a projection 55 thereon. A rear ring 56 comprises a part of the tool carrier, and intermediate the rings 53 and 56 is a disk or web member 57, which is secured to the rear ring 56 as by means of struts or tie members 58—58. The disk 57 is secured to the ring 53, as by means of an angle tie bar 59 and by a second tie bar 60. In the preferred form all the parts just described, that is, the rings 53—56, web 57, and connecting bars are all integrally formed. The tie bar 60 is preferably provided with a gibbed way 61 for holding or guiding a tool slide. The rear ring 56 in the particular form shown and as will appear more particularly in Figs. 1, 2 and 12 is warped, so as to avoid interference with certain other parts of the machine.

The skeleton tool carrier is further provided with a relatively long boss 62 on the disc 57 and which is accurately bored at 63 to fit upon a bearing sleeve 64' on or directly upon an extended stem member 64, rigidly secured to the front end of the turret, as appears more clearly in Fig. 4. The bearing sleeve 64' at one end may abut a shoulder on the stem and is doweled or otherwise rigidly secured thereto. The bearing boss 62 and through it the entire tool carrier is held against longitudinal movement on the stem 64 by being interposed between a shoulder on the sleeve 64' and a collar 64" backed up by nuts 64''' threaded on the sleeve 64'. The stem 64 also acts to position or assist in positioning the spindle carrier, tool carrier and associated parts longitudinally of the machine frame. As illustrated, the end of the stem has a bearing bushing 200 rigidly held thereon between a shoulder on the stem and lock nuts 201. The bearing bushing may further be doweled to the stem. The bearing bushing 200 has thrust flanges for engagement with the sides of the capped bearing 202 on the frame 5. With the stem 64 thus held against endwise movement on the frame the spindle carrier and parts associated therewith will be definitely located.

In the form shown I provide swinging forming tools 65—65, which are carried on tool bars 66—66 pivotally mounted in the two rings 53—56, as by means of bearing studs 67—67. Thus, the tools may be swung to operative and inoperative positions. For the purpose of swinging the forming tools each tool bar 66 has an actuating arm 68, provided with a cam roller 69 for coaction with an appropriate cam of the cam means 11 (Figs. 4, 6).

The feed cam mechanism 11 is preferably carried by the bearing boss 62 and as shown in Fig. 4 comprises a sleeve 205 rotatably mounted on the bearing boss and held between a shoulder 206 and a thrust collar and lock nuts 207 at the end of the boss. The sleeve 205 has secured thereto a cam carrying annulus 208, of which the ring gear 40 forms a part, and to which are secured the cam rings 209 each having a cam groove 210, one for each forming tool. Each cam groove is formed so as to hold the tools in retracted position during indexing and, during the coupled movement of the two carriers, to jump the tools to cutting position, then feed the same, and thereafter retract the tools.

End working tools, such as 70, may be carried upon a longitudinally movable tool slide 71 (Fig. 4), which may be slidably mounted upon the turret stem 64 or bearing sleeve means thereon and which may be partly carried or at least guided by a guide arm 72, slidable in the gibbed way 61 of the tie member 60. The tool slide 71 has an arm 73 projecting through the web 57 (Figs. 4, 12) and carrying a cam roller 74 for coaction with a cam groove 74' of the cam sleeve 205.

As has been heretofore stated, the tool carrier in the preferred form is rigidly secured to the spindle carrier, so that both move together during the cutting time of the tools. During the idle time or what may be termed the indexing time, that is, when the tool carrier group is being indexed or moved to the next station, the spindle carrier and the tool carrier are independent of each other and are preferably independently moved, while during the coupled operation the spindle carrier and tool carrier are preferably moved by a common means.

The tool carrier during the cutting time is locked to the spindle carrier by means of a lock bolt and clamped thereto by drawing the ears 54—54 of the ring 53 together, so as to hold the spindle carrier and tool carrier unitarily. As illustrated, the tool carrier carries a locking bolt 75 (Fig. 10), which passes through an aperture 76 in the ring 53 and is adapted to successively take in each of the locking slots 52—52 of the spindle carrier. The bolt 75 through a slide member 77 may be spring pressed inwardly by means of a spring 78 and may be moved by means of a lever 79, shown particularly in Figs. 10, 13 and 16. The locking bolt 75 is automatically withdrawn from each locking slot at the appropriate time in the cycle of the machine, so as to permit the tool carrier group to be returned to its starting position or, in effect, to the next station.

The machine frame carries a pivoted lever 80, having an arcuate shoe 81, positioned over a cam roller 82 on the lock bolt lever 79. A spring 83 interposed between the lever 80 and a plunger 84 coacting with the frame urges the lever 80, so as to urge the arcuate shoe 81 out of contact with the cam roller 82, and the lock bolt is maintained in its locking slot 52. When the end of the coupled movement of the spindle carrier and tool carrier has been reached the lever 80 is rocked, so as to cause the arcuate shoe 81 to engage the roller 82 and rock the lever 79, so as to positively withdraw the locking bolt 75. For the purpose of automatically rocking the lever 80 for causing the withdrawal of the locking bolt I may employ cams 85 (Figs. 7, 13), which may be rigidly carried by the spindle carrier 6 at the rear end thereof. In a 4-spindle machine it will be clear that the lever 80 should be rocked by a cam 85 four times during one complete revolution of the spindle carrier, and therefore four cam bumps or lands should be provided and properly spaced. When the cam releases the lever 80 the spring 83 serves to rock the lever to release the locking bolt and, if it is in registry with the locking slot, the spring 78 automatically causes it to engage therewith and hold the spindle carrier and tool carrier against rotative movement.

For the purpose of clamping the ring 53 of the tool carrier to the spindle carrier automatic means have also been provided, whereby when the locking bolt is in locking position the ring 53 is clamped to the spindle carrier, and when the locking bolt is out the ring 53 is unclamped from the spindle carrier so as to permit indexing. In the form illustrated the ears 54—54 of the ring 53 are provided with bushings 87—87, which may be adjustably threaded into openings in the ears and locked in desired position, as by means of set screws 88—88. The bushings 87—87 are right and left hand threaded internally, and a connecting bolt or pin 89 is provided having right and left hand threads coacting with the threads of the bushings 87. Thus, upon rotation of the right and left hand threaded bolt 80 the ears will be drawn together or forced apart, so as to cause clamping or unclamping of the ring to or from the spindle carrier.

As illustrated more particularly in Fig. 15, the clamping bolt 89 non-rotatively carries a lever plate 90, which is spring pressed in a direction to cause approach of the ears with consequent clamping of the ring 53. Such action may be accomplished by means of a spring 91 and plunger 92, which coacts with an abutment 93 on one of the ears or other suitable part. In order to unclamp the ring the lever 90 may be rocked or rotated against the pressure of the spring 91. The lever 90 is provided with a cam roll 94, engageable by an arcuate shoe 95 carried upon a lever 96, pivoted on the frame of the machine (Fig. 14). The lever 96 may be urged to its inoperative position, that is, out of contact with the cam roll 94, by means of a plunger 97 engaging the frame and a spring 98. When the lever 96 is rocked so as to cause the shoe 95 to engage and depress the roller 94, the lever 90 is rocked against the spring 91, so as to rotate the clamp bolt 89 and unclamp the ring 53. In order to rock the lever 96 for causing an unclamping, the lever may be provided with a cam roller 99, for engagement with cams 100, which may be carried by the spindle carrier, as heretofore described in connection with the cam means 85.

Thus, with a proper spacing of the cams 85 and 100, the lock bolt will be withdrawn and the clamp released, so as to permit indexing and at the proper time the lock bolt and the clamp will be spring pressed, to cause locking and clamping of the spindle carrier and tool carrier. During the locked or coupled movement of the carriers the tooling operations are performed on the work. In the particular form illustrated the cams 85—100 and the indexing ring gear 42 are all integral with each other and are secured to the spindle carrier.

*Stock feed and chucking mechanism*

The machine illustrated as a multiple spindle bar machine involves stock feeding and chucking mechanism, and I have devised novel means for effecting the feed and chucking functions in a very effective manner. The parts are arranged so that group operation may be effected for the purpose of producing a greater number of finished pieces when the simplicity of such pieces permits.

In the arrangement illustrated the stock feeding and chucking functions are performed during a rotative movement of the spindle carrier, but the indexing mechanism for the tool carrier group is relieved of the rather heavy work of chucking and stock feeding. In machines heretofore in use the stock feeding and chucking has been effected during a rotative or indexing movement of the spindle carrier, but the relatively heavy strains incident to such operations has been taken on the indexing mechanism for the spindle carrier. By the arrangement herein illustrated the indexing mechanism is relieved of such strains.

Referring particularly to Fig. 11, each spindle 101 is provided with work holding or chucking means, which may comprise draw-back collet jaws 102 for gripping the stock 103. The collet tube 104, as is usual, passes rearwardly through the spindle and is drawn rearwardly to gripping position by means of the chucking fingers 105 in a manner well known in the art, and no specific description is considered necessary. The fingers 105 may be actuated by a cone 106 on a chucking slide 107, which is guided on suitable slideways 108, preferably formed on a rearward extension 109, rigidly carried by the spindle carrier, it being understood that the extension 109 has proper slideways for the chucking slide of each spindle. Each slide guide 108 may also serve as the corresponding guide for the stock feed slide 110, which may be similar to the chucking slide. Each stock feed slide 110 is secured to its feed tube 111, which extends forwardly and is provided with the usual feed fingers 112, so as to resiliently grip the stock and feed the same in a well known manner.

The cams for actuating the chucking and feed slides are preferably arranged so as to be readily displaced to an inoperative position and moved to an operative position, as will be later described. I contemplate the employment of duplicate cams at circumferentially spaced points, so that cut-off may take place at various selected positions and whereby the stock feeding and chucking mechanism of certain spindles may be actuated in groups. As shown, there is a lower arcuate cam plate 113 having a cam groove 114 for the cam roller 115 of each chucking slide and a cam groove 116 for the cam roller 117 of each stock feed slide. The lower cam 113 may be pivotally mounted at 118 to the frame of the machine, so that it may be dropped down to an inoperative position. The cam 113 is held in operative position by suitable means, such as a fixed pin or abutment 119 (Fig. 7), which may engage a notch in the cam, and a spring pressed tapered plunger 120 may engage the pin 119 to securely hold the cam 113 in place. Upon merely withdrawing the spring pressed plunger 120 the cam 113 may drop to an inoperative position.

The cam groove 114 is of such formation that during traverse of the cam roller 115 the chucking slide 107 is first moved to unchuck the work and thereafter the stock feed cam roll 117 on the corresponding spindle feeds the stock forward in a well known manner. Then the stock feed cam 114 again shifts the cam roll 115 to chuck up the stock. Such operation in general is well known in this art.

In order to vary the length of stock fed by the stock feed slide 110, the stock feed cam 116 may be built up of removable sections 121 (Fig. 3), which may be added or taken away so as to determine the extent to which the stock feed tube is drawn back for a new grip of stock. Clearly, in lieu of the built-up cam sections 121 or in addition thereto suitable stop mechanism may be employed, as is usual.

With the lower cam 113 operating on all of the slides in sequence, cut-off will take place in the lower spindle position. I prefer also to employ another cam similar to the cam 113 and positioned at a spaced circumferential point on the frame. In the form shown such a second cam 122 (Figs. 1, 2, 3, 7) is located diametrically opposite the cam 113. The upper cam 122 may be pivoted to the frame at 123 and held in operative position by an abutment 124 and spring pressed plunger 125 in a manner similar to that already described in connection with the cam 113. When employing the upper cam 122 instead of the lower cam 113, cut-off will take place in the upper position. It is also possible to employ both the cams 113 and 122 and arrange cut-off tools in both the upper and lower positions, so that cut-off may take place in both the upper and the lower position, and the machine might then be considered as a double two-spindle machine producing two finished pieces for each index or station to station movement and eight pieces during a complete revolution of the spindle carrier.

It will be seen that with fixed feed and chucking cams, stock chucking and feeding functions will be performed during rotation of the spindle carrier. During the accomplishment of the stock unchucking, feeding, and chucking, the spindle carrier is driven by the very powerful spur gear drive 41—42, and what may be termed the indexing mechanism or the mechanism for effecting the coupled drive of the spindle carrier and tool carrier and return movement of the tool carrier is relieved of the relatively heavy work of unchucking, stock feeding and chucking. The feed tube draw-back, which is a relatively light operation, may be effected by the indexing mechanism during the coupled drive.

I have also devised means for causing group actuation of the stock feeding and chucking mechanism of a plurality of spindles. In the form shown and referring particularly to Fig. 7, the stock feeding slide 110 of what may be termed the No. 1 spindle is provided with a spring pressed plunger 126, which may be latched in a retracted position by means of a cross pin 127, which may be turned across the slot 128. When the cross pin, carried by the plunger, is within the slot, as shown in Fig. 7, the spring pressed plunger will be spring pressed forwardly and will take into a locking aperture 129 in the stock feed slide of what may be termed the No. 2 spindle. Each slide is preferably provided with a locking plunger or a locking aperture so that two adjacent slides may be locked together as described. As illustrated, the slides of the No. 1 and No. 2 spindles are secured together, as are the slides of the No. 3 and the No. 4 spindles.

The chucking slide 107 of each spindle is provided with means which may be duplicates of the plungers or apertures of the stock feed slides, so that corresponding chucking and feed slides may be locked together for group operation of the slides.

With the corresponding slides of adjacent spindles coupled together so as to form two unitary groups of the slides of the four spindles and employing both cams 113, 122, it will be seen that the slide cam rolls of one spindle in each group will always traverse one of the cams during each station-to-station movement of the spindle carrier, and consequently all of the slides will be actuated during each said movement and four finished pieces will be produced during each quarter revolution of the spindle carrier, or sixteen pieces for a complete revolution thereof.

Thus, without any changes in the machine itself, operations may be performed as follows: with the slides independent of each other, that is, with the locking bolts such as 126 withdrawn and only one of the chucking and feed cams 113, 122 in use, the production is that of a standard four-spindle automatic, that is, a single piece is produced after presentation to tools in four positions, and one piece is produced at each index or quarter revolution of the spindle carrier, and four pieces for a complete revolution. By employing both of the stock feeding and chucking cams 113, 122 the machine, without any changes, becomes a double two-spindle automatic, and with proper tools for cutting off in two positions the production will be two finished pieces for each index or quarter revolution, or eight pieces for a complete revolution of the spindle carrier. By employing both sets of cams and coupling the stock feed and chucking slides of adjacent spindles together in two groups and providing cut-off tools in each position or station, four pieces will be produced during each index or quarter revolution of the spindle carrier, and sixteen pieces produced during a complete revolution thereof.

The particular method of operation of the machine will depend upon the complexity of the tooling operations to be performed. When the operations are very simple, sixteen pieces may be produced during a complete revolution of the spindle carrier; with more complex pieces, where a greater number of tools must be brought to bear, the machine may be arranged to produce eight pieces per complete revolution, and when the most complex pieces for which the machine is designed are to be produced, one piece will be produced with each index, or four pieces for a complete revolution.

*General operation*

The general operation of the machine is as follows: When power is applied to the main driving shaft as through the pulley 13, the gear 16 (Fig. 17) is rotated and being in mesh with the drive pinion 17 (Fig. 4), the main spindle drive shaft 18 is rotated so as to rotate all of the spindles through their drive gears 20 (Fig. 9). The feed works may then be thrown in by movement of the handle 26 to the position shown in Fig. 1, which movement throws in the clutch 25 and the various feed gears are rotated. Assuming the present position of the parts, the drive shaft 35 will be rotating the drive pinion 41 (Fig. 18) which in turn drives the drive gear 42 for rotating the spindle carrier. As heretofore described, during rotation of the spindle carrier by the powerful drive through pinion 41, stock is unchucked, fed, and again chucked. During this rotative movement of the spindle carrier, cams of the rotating cam group 11 (Figs. 4, 5, 6) will hold all of the tools in retracted or non-cutting positions. During the rotation of the spindle carrier by the drive pinion 41, the cams 85, 100, carried by the spindle carrier will be in such positions as to rock the levers 80, 96 (Figs. 14, 16) and maintain the ring 53 of the tool carrier in unclamped position and the lock bolt 75 in retracted position.

As shown particularly in Fig. 18, the tool carrier, together with its tools, is being indexed during this portion of the cycle and is about halfway back to starting position. Due to the characteristics of the elliptical gears this indexing or return movement of the tool carrier is at a rapid rate and is represented by the extreme left-hand scale of Fig. 18 which indicates angular positions transformed to corresponding angular positions of the main drive shaft 35. When the tool carrier returning with the angular velocity indicated by the left-hand scale of Fig. 18 reaches the 50° position, the tool carrier will have been harmonically decelerated; from 50° to 60° the tool carrier will have been stopped and harmonically accelerated until at the 60° point represented in the middle scale of Fig. 18 the tool carrier will have been brought up to the speed of the spindle carrier being rotated by the drive pinion 41 and ring gear 42. At about this point, when the two speeds, that is, the speed of the spindle carrier and the speed of the tool carrier, are substantially the same, the locking bolt 75 is spring pressed into the appropriate locking slot 52 in the spindle carrier, and the tool carrier ring 53 is clamped to the spindle carrier. The pawl 51 at this time also drops into the appropriate slot 52. This locking and clamping, as heretofore described, is effected preferably by resilient means illustrated in Figs. 14, 15, and 16, and is permitted by the cams 85 and 100 moving out from under the rollers and permitting the rock arm shoes 81 and 95 to release the lock bolt and clamp hold-out means. The spindle carrier and tool carrier being now locked together must move unitarily.

The coupled or unitary movement of the two carriers is effected by the elliptical gear drive and, as indicated diagrammatically in Fig. 18, the angular velocity of the coupled carriers during the coupled drive by the elliptical gears varies only slightly from the constant angular velocity which would be given the spindle carrier by the main drive shaft 45 driving through the pinion 41. The right-hand scale in Fig. 18 indicates this constant angular velocity of the drive shaft 35, and it will be seen that during the coupled drive between the carriers the angular velocity during the first portion of the coupled drive is slightly greater than the corresponding drive which would be possible with the drive pinion 41, and the ring gear 42 drives the drive pinion 41, and the splined connection indicated at 43—44 permits the drive pinion 41 to run ahead of the drive gear 35. During the latter portion of the coupled drive the velocity of the coupled members is slightly decelerated, until at the 310° point the drive shaft 35 will again engage and drive the pinion 41. At about this point the cams 85, 100 again rock the levers 80 and 96 so as to unclamp the tool carrier from the spindle carrier and withdraw the locking bolt. The spindle carrier rotation is then continued by the drive pinion 41.

From the 310° point on the middle scale to about the 320° point the tool carrier is again harmonically decelerated, stopped, and started in the opposite direction, in which direction it is rapidly moved to again be positioned so as to be coupled to the spindle carrier at the next succeeding station. With the particular design shown the elliptical gear and link drive are used to rotate the spindle and tool carriers during the coupled drive through 250° of an arc of the cycle of the driving shaft 35, while during the remaining 110° of the arc the tool carrier is indexed and the drive shaft 35 and pinion 41 rotate the spindle carrier independently of the tool carrier, which latter is always driven by the elliptical gear drive.

During the coupled drive the variation in the angular velocity of the spindle carrier does not vary in the particular design shown more than about 8° from the constant velocity which would be given it by the drive pinion 41. Such variation in angular velocity is negligible, particularly when it is considered that at the beginning and at the end of the coupled drive the velocity of the spindle carrier is the same, no matter by which of the two means it is driven.

Thus, the relatively ponderous mass comprising the spindle carrier and its spindles, together with the bar stock and stock reel and associated parts are all rotated substantially continuously with only very slight variations in angular velocity. There are, therefore, none of the strains incident to the ordinary indexing of such a spindle carrier and associated parts. The relatively lighter tool carrier is rapidly indexed, but the characteristics of the tool carrier drive mechanism are such that the tool carrier movement, while very rapid in one direction, is always smooth and not subjected to any substantial shocks. During the coupled drive of the spindle and tool carriers, the tooling operations are performed. The feed cams of the cam group 11 rotate in a direction opposite to the direction of rotation of the spindle carrier, and the gear rotations are such that one complete revolution of the cam group is effected during a quarter revolution (for a four-spindle machine) of the spindle carrier.

The time of indexing or what may be termed the uncoupled portion of the drive is never more than one-half the cutting time of the tools, no matter how short that time may be. Thus, the principal advantage of a multiple spindle machine is attained without the usual disadvantages.

As heretofore stated, by employing either the stock feed and chucking cam 113 or the corresponding cam 122 and without any changes in the machine, the point of cut-off may be varied. By employing only one of the cams the machine operates after the fashion of a four-spindle automatic, producing a finished piece at each quarter revolution, or four pieces during a complete revolution of the spindle carrier. By employing both of the cams 113, 122 the machine is at once transformed into a double two-spindle automatic and two finished pieces are produced at each quarter revolution of the spindle carrier, or eight pieces during a complete revolution thereof. Further, when the stock feeding and chucking slides are actuated in groups of two each and both cams 113, 122 are employed, four finished pieces are produced during each quarter revolution of the spindle carrier, or sixteen finished pieces during a complete revolution thereof. The relative simplicity of the work will determine the method of operation to be employed. These three methods of operation require no structural changes in the machine but only a modified or combined use of the parts on it.

In disclosing the principles of the invention I have illustrated more or less conventionally forming and end working tools. Clearly, the tools may be variously arranged in accordance with known practice and other forms of tools variously actuated might be employed.

While the invention has been described in considerable detail and preferred forms illustrated, it is to be understood that various features may be used independently of other features illustrated and in machines of other types. It is also to be understood that various changes, additions and omissions may be made within the scope of the invention as defined in the appended claims.

I claim:

1. In a machine of the character indicated, a revolubly mounted tool carrier, a revolubly mounted work carrier, means for rotating said tool carrier at a high rate of speed in one direction and at a low rate of speed in the opposite direction, and means for causing said work carrier to be rotated by said tool carrier at said low rate of speed, for the purpose described.

2. In a machine of the character indicated, a revolubly mounted work carrier, an oscillatably mounted tool carrier, means for oscillatably moving said tool carrier, and means for revolubly driving said work carrier by said tool carrier, for the purpose described.

3. In a machine of the character indicated, a revolubly mounted work carrier, an oscillating tool carrier, means for oscillating said tool carrier, means for causing said work carrier to be actuated by said tool carrier upon one oscillating movement thereof, and independent means for actuating said work carrier during the other oscillating movement of said tool carrier to cause said work carrier to always rotate in the same direction.

4. In a machine of the character indicated, a revolubly mounted work carrier, two independent means for revolving said work carrier in the same direction at different times, and means for performing a tooling operation on work carried by said work carrier during revolving movement of said work carrier by one of said means.

5. In a machine of the character indicated, a revolubly mounted work carrier, an oscillatably mounted tool carrier, means for oscillating the same, and means for causing said tool carrier to rotate said work carrier during a part of the oscillating movement thereof and separate means for continuing the rotation of said work carrier during the other oscillating movement of said tool carrier.

6. In a machine of the character indicated, a revolubly mounted work carrier, an oscillatably mounted tool carrier, means for rigidly securing said work and tool carriers to each other against relative rotary movement in either direction whereby both may be moved in unison, and means for releasing said work and tool carriers from each other whereby they may move independently of each other.

7. In a machine of the character indicated, a revolubly mounted work carrier, a revolubly mounted tool carrier, and a locking bolt for periodically locking said work and tool carriers to each other against relative rotary movement in either direction whereby they will move as a unit, for the purpose described.

8. In a machine of the character indicated, a revolubly mounted carrier, a continuously rotatable driving member, a drive gear mounted thereon with a circumferentially lost motion connection for revolving said carrier, and a second means operable by said driving member for rotating said revolubly mounted carrier independently of said gear, said carrier and said second means carrying coacting tools and work holders.

9. In a machine of the character indicated, a frame, a work carrier revolubly mounted thereon, a plurality of chucks carried by said work carrier, a tool carrier, a tool carried thereby, means for rigidly locking said tool and work carriers together against relative rotary movement in either direction for unitary movement, and means actuatable by means movable with one of said carriers for disengaging said carriers from each other.

10. In a machine of the character indicated, a revolubly mounted work carrier, a plurality of chucks carried thereby, locking means for unitarily locking said carrier to another part, means operable by a movement of said carrier for unlocking said carrier from said part and means for holding said carrier and part against relative axial movement.

11. In a machine of the character indicated, a carrier, means for locking the same for unitary movement with another part, means operable by movement of said carrier for unlocking said carrier from said other part and means for holding said carrier and part against relative axial movement.

12. In a machine of the character indicated, a revoluble work carrier, a revoluble tool carrier, means for rotating one of said carriers about its own axis in one direction, means for rotating the other said carrier in the same direction and about its own axis, and means for causing one of said carriers to periodically rotate the other of said carriers.

13. In a machine of the character indicated, a revoluble work carrier, a revoluble tool carrier, means for rotating one of said carriers about its own axis in one direction, means for rotating the other said carrier about its own axis in the same direction, and means for causing one of said carriers to periodically rotate the other of said carriers through a fraction only of a complete revolution.

14. In a machine of the character indicated, a spindle carrier, a plurality of spindles rotatably mounted therein, a central drive shaft in said carrier, drive gear means thereon, drive gears on said spindles, said carrier having radially extending slots therein at spaced apart points longitudinally thereof so as to be non-intersecting, and drive gears on said spindles coacting with said first mentioned drive gear means and accessible through said slots.

15. In a machine of the character indicated, a spindle carrier, a plurality of spindles rotatably mounted therein, a central drive shaft, drive gear means thereon, said spindle carrier having diametrically extending slots therethrough at spaced apart points longitudinally thereof so as to be non-intersecting, and drive gears on said spindles and accessible through said slots, said drive gears on said spindles coacting with said drive gear means on said central drive shaft for driving said spindles.

16. In a machine of the character indicated, a spindle carrier having a plurality of rotatable spindles therein, stock chucking and feeding means for each spindle, and a pair of oppositely disposed cam means for actuating said stock chucking and feeding means, for the purpose described.

17. In a machine of the character indicated, a spindle carrier, a plurality of spindles rotatably carried thereby, stock feeding and chucking means for each said spindle, and circumferentially spaced independent cam means for actuating said means, for the purpose described.

18. In a machine of the character indicated, a spindle carrier, a plurality of spindles rotatably carried thereby, stock feeding and chucking means for each said spindle, and a plurality of independent cam means for actuating said feeding and chucking means, one of said cam means being readily displaceable to an inoperative position.

19. In a machine of the character indicated, a spindle carrier, a plurality of spindles rotatably carried thereby, stock feeding and chucking means for each said spindle, cam means for actuating said stock feeding and chucking means, said cam means being readily displaceable to an inoperative position.

20. In a machine of the character indicated, a spindle carrier, a plurality of spindles rotatably carried thereby, stock feeding and chucking means for each said spindle, and fixed cam means for actuating the stock feeding and chucking means of each said spindle during an indexing movement thereof, said cam means being readily displaceable to an inoperative position and readily movable to an operative position.

21. In a machine of the character indicated, a spindle carrier, a plurality of spindles rotatably carried thereby, stock feeding and chucking means for each said spindle, fixed cam means located at spaced circumferential points and independent of each other, said stock feeding and chucking means having parts engageable seriatim with said independent cam means, for the purpose described.

22. In a machine of the character indicated, a spindle carrier having a plurality of spindles rotatably mounted therein, stock feeding and chucking means for each said spindle, and a plurality of independent fixed cam means spaced circumferentially of said carrier for actuation of said stock feeding and chucking means during an indexing movement of said carrier, said cam means being readily displaceable to inoperative positions.

23. In a machine of the character indicated, a spindle carrier, a plurality of spindles rotatably mounted therein, stock feeding and chucking means for each said spindle, and means for releasably locking a plurality of said stock feeding and chucking means together in groups whereby the stock feeding and chucking means of said groups may be actuated as units.

24. In a machine of the character indicated, a spindle carrier having a plurality of spindles rotatably mounted therein, stock feeding and chucking means for each said spindle, means for releasably locking certain of said stock feeding and chucking means together in groups, and a plurality of cam means for actuating each of said groups.

25. In a machine of the character indicated, a spindle carrier, a plurality of spindles rotatably carried thereby, stock feeding and chucking means for each said spindle, and means for actuating said stock feeding and chucking means of a group of said spindles independently of the actuation of the stock feeding and chucking means of another group of said spindles.

26. In a machine of the character indicated, a spindle carrier, a plurality of spindles rotatably carried thereby, stock feeding and chucking means for each said spindle, means carried thereby for locking adjacent stock feeding and adjacent chucking means together in independent groups, and means for actuating each of said groups.

27. In a machine of the character indicated, a spindle carrier, a plurality of spindles rotatably mounted therein, a slide guide member carried by said spindle carrier, stock feeding and chucking slides for each of said spindles and guided by said slide guide, and means for actuating said slides.

28. In a machine of the character indicated, a spindle carrier, a plurality of spindles rotatably carried thereby, stock feeding and chucking slides for each said spindle, spring pressed latch means carried by some of said slides and movable to latch adjacent slides together whereby adjacent slides will be unitarily moved, and cam means for moving said slides.

29. In a machine of the character indicated, a spindle carrier, a plurality of spindles rotatably mounted therein, stock feeding and chucking slides for each said spindle, a cam follower for each said slide, means for locking said slides together in groups for unitary action, and a plurality of cam means for actuating each of said groups in series.

30. In a machine of the character indicated, a spindle carrier, a plurality of spindles rotatably mounted therein, stock feeding and chucking slides for each said spindle, a cam follower for each said slide, means for locking said slides together in groups for unitary action, and diametrically opposed cam means for coaction with the cam followers of said slides.

31. In a machine of the character indicated, a spindle carrier, a plurality of spindles carried thereby, stock feeding and chucking means for each said spindle, cam follower means for said stock feeding and chucking means, fixed cam means to be engaged by said cam follower means upon an indexing movement of said spindle carrier for actuating the same upon such indexing movement, said cam means being pivotally mounted on a frame whereby the same may be manually swung to an inoperative position.

32. In a machine of the character indicated, a spindle carrier, a plurality of spindles carried thereby, stock feeding and chucking means for each said spindle, a cam follower for each said means, fixed cam means for actuating said stock feeding and chucking means upon an indexing movement of said spindle carrier, and means for unitarily connecting a plurality of said stock feeding and chucking means in groups whereby the stock feeding and chucking means of all spindles in each group will be actuated by the cam follower of each spindle in such group, for the purpose described.

33. In a machine of the character indicated, a work carrier having a plurality of chucks, a tool carrier having tools for acting upon work carried by said chucks, said tool carrier being oscillatable and said work carrier being rotatable, means for independently moving said work carrier and said tool carrier in the same rotary direction, and means for securing said work and tool carriers to each other while moving in the same direction.

34. In a machine of the character indicated, a revoluble work carrier, an oscillatable tool carrier having a tool to act upon work carried by said work carrier during combined movements of said work and tool carrier, and means for gradually decelerating oscillating movement of said tool carrier in one direction.

35. In a machine of the character indicated, a work carrier having a plurality of chucks, means for rotating said work carrier, an oscillatable tool carrier having means for acting upon work carried by said chucks, and means for driving said tool carrier about an axis coincident with the axis of said work carrier and gradually decelerating movement of said tool carrier toward one limit of its movement.

36. In a machine of the character indicated, a work carrier having a plurality of chucks, means for rotating said work carrier, an oscillatable tool carrier having means for acting on work carried by said chucks, means for oscillating said tool carrier in the same direction as the direction of revolution of said work carrier, and means for securing said work and tool carriers to each other for unitary movement while said carriers are moving in the same direction.

37. In a machine of the character indicated, a work carrier having a plurality of chucks, an oscillatable tool carrier having means for acting on work carried by said chucks, and means for independently driving said work and tool carriers in the same direction during a portion of their movements and means for locking said work and tool carriers to each other while moving in the said same direction.

38. In a machine of the character indicated, a work carrier having a plurality of chucks, an oscillatable tool carrier having means for acting upon work carried by said chucks, means for oscillating said tool carrier and gradually accelerating and decelerating movement thereof near one limit of its stroke, and means for securing said work and tool carriers to each other for unitary movement during a portion of their movements.

39. In a machine of the character indicated, a carrier, a continuously rotatable driving member, means having a lost motion connection between said driving member and said carrier for rotating the latter at times, a second carrier, means for moving the same independently of said first carrier, means for coupling said two carriers together whereby one of said carriers may be driven by the other, and means for performing tooling operations on work carried by one of said carriers.

40. In a machine of the character indicated, a rotatable spindle carrier having a plurality of rotatable spindles, bar stock carrying means rotatable with said carrier, means externally of the circumferential line through said spindles for rotating said spindle carrier substantially continuously, a tool carrier mounted for oscillation, means for causing said work and tool carriers to be moved in unison and in the same direction whereby tool operations may be performed by tools carried by said tool carrier, and means for oscillating said tool carrier.

41. In a machine of the character indicated, a spindle carrier having a plurality of rotatable spindles, a stock reel and stock tubes movable with said spindle carrier, an oscillatable tool carrier, and means for oscillating said tool carrier and rotating said spindle carrier together with stock reel and stock tubes, substantially continuously.

42. In a machine of the character indicated, a spindle carrier, means for rotating the same, stock feeding means actuable upon rotation of said spindle carrier while being rotated by said first mentioned means, a tool carrier, and means for causing said tool carrier to rotate said spindle carrier and associated parts after stock feeding operations.

43. In a machine of the character indicated, a substantially continuously rotatable work carrier having a plurality of chucks, an oscillatable tool carrier carrying a plurality of tools to act on work carried by said chucks, means for oscillating said tool carrier, and means for feeding one of said tools relatively to another tool independently of each other.

44. In a machine of the character indicated, an oscillating tool carrier carrying a tool, means carried by said tool carrier for moving said tool relatively to said tool carrier, and means for actuating said tool actuating means.

45. In a machine of the character indicated, a work carrier having a plurality of chucks, a tool carrier having a tool, means for securing said tool carrier and work carrier together against relative rotary motion, means for driving one of said members in a rotary direction while said carriers are secured together, and means for continuing rotary movement of one of said carriers when said carriers are released from each other.

46. In a machine of the character indicated, a spindle carrier having a plurality of rotatable spindles and mounted for rotation, a tool carrier mounted for oscillation about the axis of rotation of said spindle carrier, means for clamping said tool carrier and said spindle carrier together for unitary rotation, means for rotating said tool carrier at a substantially uniform rate while said tool and spindle carriers are clamped together and for returning said tool carrier to starting position at an accelerated rate, together with means for continuing the rotation of said spindle carrier when said spindle carrier and tool carrier are released from each other.

47. In a machine of the character indicated, a rotatable spindle carrier having a plurality of rotatable spindles, bar stock carrying means associated with said spindle carrier and rotatable therewith, gear and pinion means for rotating said spindle carrier and associated parts during a portion of its revolution, fixed cam means, stock feeding and chucking means actuated thereby upon and by rotation of said spindle carrier by said gear and pinion means, an oscillatable tool carrier, means for moving the same in one direction at substantially the speed of rotation of said spindle carrier by said gear and pinion means, means for securing said spindle carrier and tool carrier together for unitary movement and driving said spindle carrier by said tool carrier, and means for causing tool operations to be performed during movement of said spindle carrier by said tool carrier.

48. In a machine of the character indicated, a tool carrier, a spindle carrier, means for rotating one of said members by spur gear means, means for rotating the other of said members by variable speed gear means, means for securing said carriers together for unitary movement, and a lost motion connection to one of said carriers and its gear means whereby one carrier will be driven by the other.

49. In a machine of the character indicated, a tool carrier, means for oscillating the same in one direction during the major portion of its movement at a substantially uniform rate and for smoothly accelerating and decelerating its movement at the beginning and end of its rotary motion and returning said tool carrier at a rapid rate, a work carrier, and means for clamping said tool and work carriers together and driving said work carrier by said tool carrier during its movement at substantially uniform speed.

50. In a machine of the character indicated, an oscillatable tool carrier, a swinging tool carried thereby, means carried by said tool carrier for swinging said tool, a work carrier, and means for moving said work and tool carriers in unison at times.

51. In a machine of the character indicated, a spindle carrier, having a plurality of chucks and mounted for rotation, a main drive shaft, a pinion thereon, a gear carried by said spindle carrier and meshing with said pinion, a lost motion connection between said carrier and main drive shaft, a non-circular gear driven by said main drive shaft, a second non-circular gear meshing with said first non-circular gear, an oscillatably mounted tool carrier, means for oscillating the same by said second non-circular gear, and means for securing said work and tool carriers together for causing said work carrier to be rotated by said tool carrier during a portion of its movement.

52. In a machine for acting on bar stock, means for rotating a bar of stock continuously about its own axis and continuously in an orbit, means for feeding predetermined lengths of the bar at intervals and while rotating as aforesaid, and means for performing a tooling operation on said bar including severing of said predetermined lengths while said bar is rotating as aforesaid.

ROBERT S. BROWN.